Oct. 16, 1945.    J. J. OSPLACK    2,386,880
INDEXING FIXTURE FOR MACHINE TOOLS
Filed Feb. 5, 1943    2 Sheets-Sheet 2
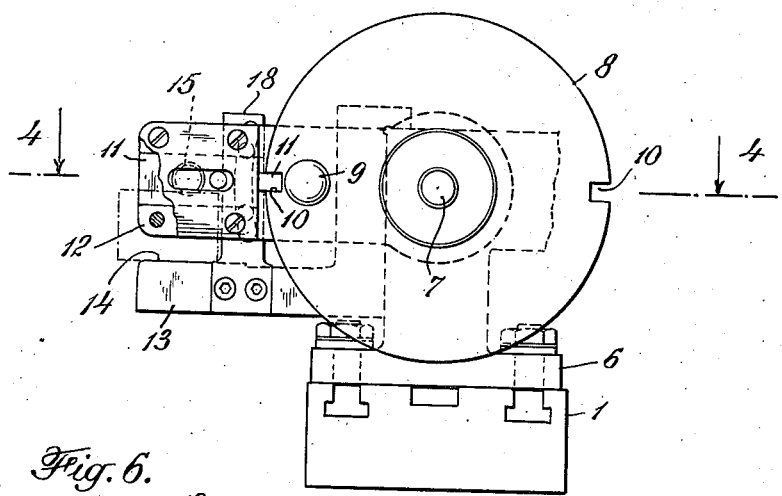
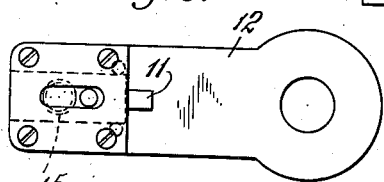
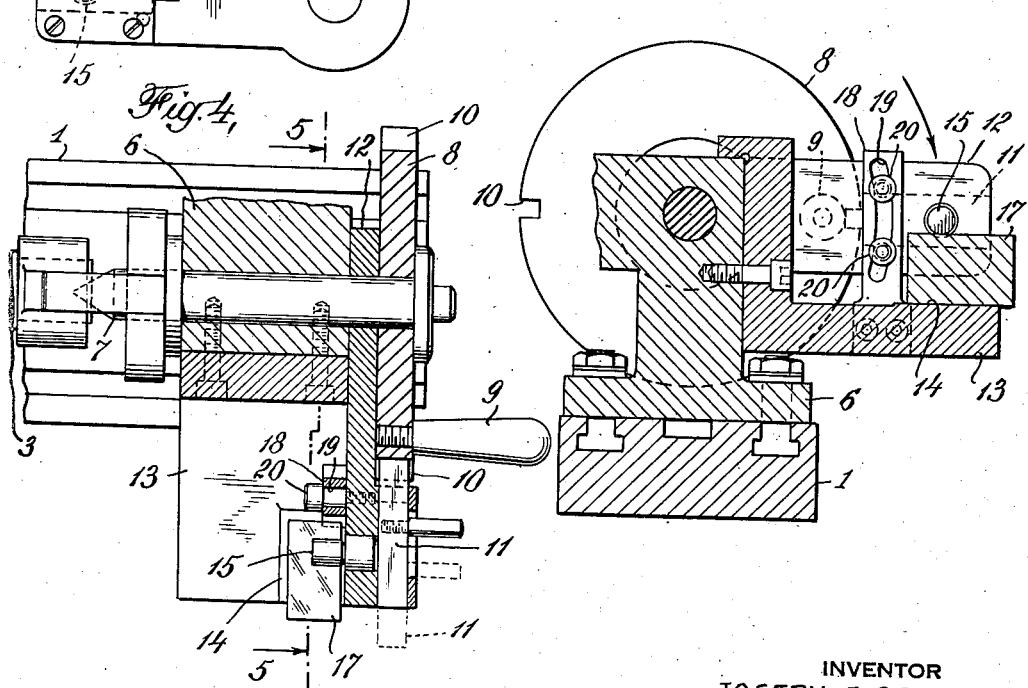
INVENTOR
JOSEPH J. OSPLACK
BY
ATTORNEYS Patented Oct. 16, 1945

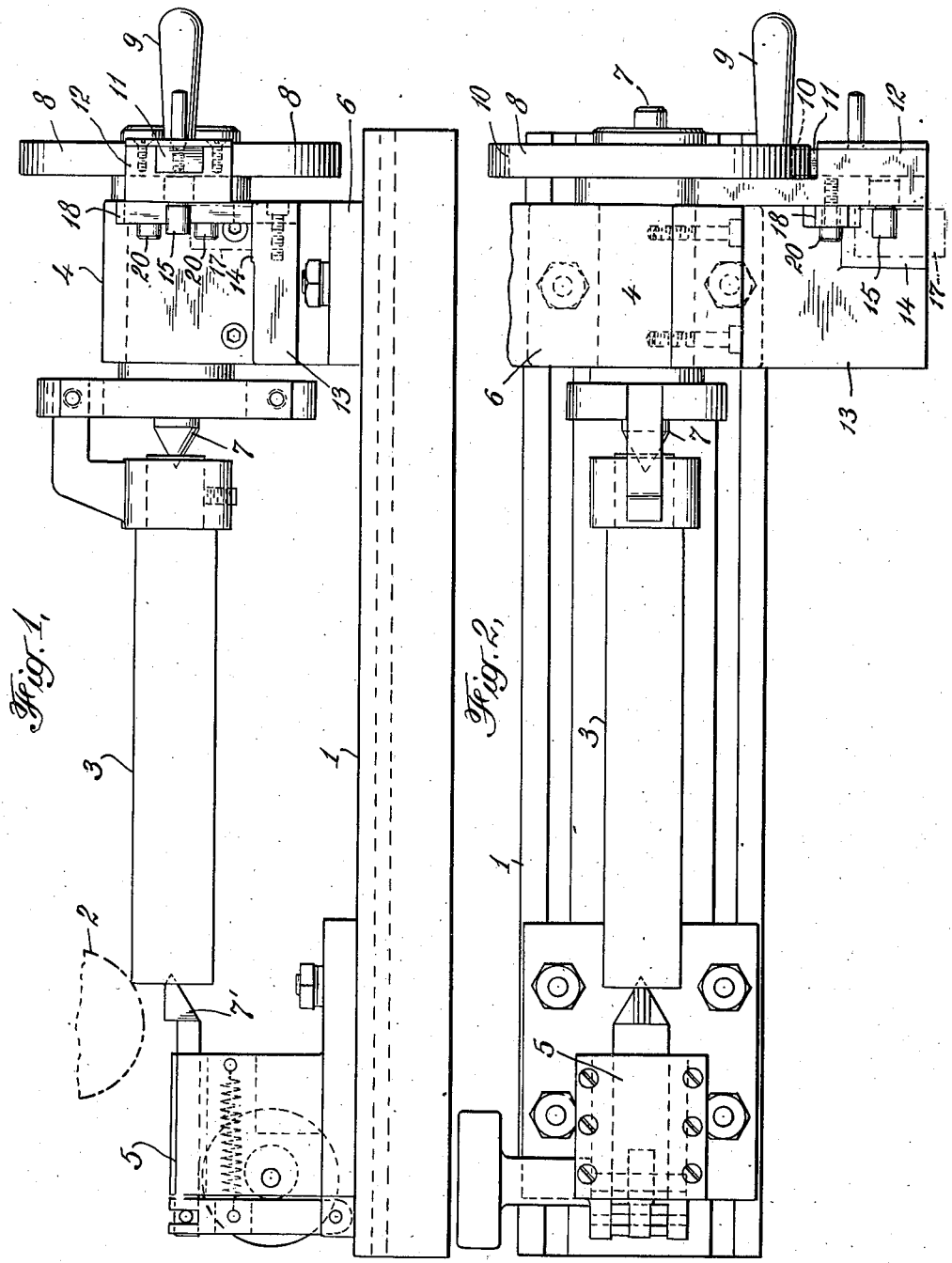

2,386,880

UNITED STATES PATENT OFFICE 2,386,880

INDEXING FIXTURE FOR MACHINE TOOLS

Joseph J. Osplack, Detroit, Mich., assignor to Vinco Corporation, Detroit, Mich., a corporation of Michigan Application February 5, 1943, Serial No. 474,809

5 Claims. (Cl. 90—56)

This invention relates to indexing fixtures for machine tools and has for its object to provide a fixture by means of which the rotation of an indexing head through angles of varying degrees may be accomplished with great accuracy and without requiring special indexing wheels for each angle and also without the use of expensive precision adjusting devices.

A further object of the invention is to provide an attachment which may be readily added to indexing heads now in use and by which any angle within a predetermined range may be gauged with a single indexing wheel.

A further object of the invention is to provide an attachment of the class described which may be cheaply manufactured, which is easy to use and which can be applied to existing indexing fixtures with the use of simple tools and without modifying the structure of the fixture.

Indexing heads are used in many machine tool operations where it is necessary to rotate the piece of work about its own axis through an arc of exact measurement between operations of the tool. For example, in a gear-grinding or dressing machine it is necessary that the gear wheel be rotated periodically through arcs equal to the distance between the teeth to be ground or dressed. For example, a gear having twelve teeth must be rotated periodically through an arc of exactly 30° to thereby bring each tooth into position for grinding. In production work where there are a large number of parts of the same size and dimensions to be finished, it is customary to use an indexing fixture provided with an accurately made index wheel having the correct number of properly spaced notches throughout its periphery to insure the proper positioning of the gear at each successive grinding operation. For special work, however, where there are but few identical parts to be made, it is not feasible to make a special index wheel for each, hence upon each partial rotation of the work the amplitude of the angle of rotation must be carefully calibrated with measuring instruments in order to insure accuracy. In my improved indexing fixture any desired angle of adjustment may be obtained with a small number of standard index wheels and without elaborate measurement of the angle of rotation such as now necessary when an index wheel for the exact angle required is not available.

Referring to the drawings:

Figure 1 is a side elevation of my improved indexing fixture embodying my invention;

Fig. 2 is a plan view of the fixture shown in Fig. 1;

Fig. 3 is an end elevation looking from the right of Fig. 2;

Fig. 4 is a transverse horizontal section on line 4—4 of Fig. 3;

Fig. 5 is a vertical sectional view on line 5—5 of Fig. 4; and

Fig. 6 is a detail view of a portion of the attachment.

In said drawings, 1 indicates the bed plate of the indexing fixture which may be attached in any desired manner to the reciprocating bed of a machine tool, for example, a spline grinder, whose grinding wheel is indicated in dotted lines at 2. 3 indicates the shaft in which the splines are to be ground, and which is supported in the usual manner between the indexing head 4 and a tail stock 5 of ordinary construction. The indexing head comprises a bearing member 6 attached to the base plate and rotatably supporting the centering pin 7. The shaft to be ground is held in the usual manner between the centering pin 7 and the bearing pin 7' of the tail stock and is clutched to the centering pin 7 for rotation with it by means of the usual locking mechanism. Attached to the pin 7 is the indexing wheel 8, here shown as provided with notches 10, here shown as twelve in number, to thereby enable the indexing wheel and with it the spindle 7 and shaft 3 to be accurately rotated through a space of 30° at each operation. To facilitate the rotation of the index wheel and centering pin 7, a handle 9 is detachably mounted in the outer face of the wheel 8.

Co-operating with the notches in the periphery of the index wheel is a bolt 11 mounted for sliding movement in a radial direction on the outer face of an arm 12 which is mounted for rotation on the spindle 7 between the index wheel 8 and the bearing 6. This arm 12 may be held in stationary position by means of clamping screws 20 working in a slotted guide 18, as will be later described. By this arrangement, when the arm 12 is held stationary by the screws 20 the wheel 8 may be turned independently and the work indexed in the usual manner through predetermined angles in accordance with the notches 10 in the wheel. In such use of the apparatus the arm 12 is locked in any desired position, for example, the horizontal position illustrated in the drawings, and after the first grinding operation takes place with the index head so locked, the bolt 11 is withdrawn and the index head turned by means of the handle 9 to bring a new tooth into proper position.

In order to permit this simple fixture to be used for indexing through angles for which there is no exact index wheel, an attachment is provided consisting of an L-shaped supporting member 13 which is clamped against the side of the bearing member 6, in the manner shown particularly in Fig. 5. The upper face 14 of the horizontal part of the bracket 13 is machined off to provide a smooth horizontal surface adapted to support gauge blocks of varying thickness for co-operation with a pin 15 projecting from the arm 12 on the face opposite the bolt 11. The pin 15 is adapted to contact the gauge block on the member 14 and thereby accurately position the arm 12 with respect to the surface 14 of the member 13. In Fig. 5 I have indicated at 17 a gauge block such as used for this purpose.

Extending upwardly from the member 13 in position adjacent the face of the arm 12 alongside the pin 15 is the stationary guide member 18 referred to above. The member 18 is provided with an arcuate slot 19 through which the clamping screws 20 extend from the adjacent face of the arm 12. When the clamping screws are loosened the arm 12 may be adjusted around the axis of the centering pin 7 to the extent permitted by the length of the slot and when the screws 20 are tightened the arm 12 will be held immovable with respect to the bracket 13 in the position to which it is adjusted.

In operation the arm 12 is set so as to position its center line parallel with the upper face of the horizontal member of the bracket 13 and locked in such position by the clamping screws 20. A gauge block of appropriate thickness may be used for this purpose. The index wheel is turned to position to be locked by the bolt 11 with the arm 12 in this position. The work to be indexed is then positioned between the centering pin 7 and tail stock 5 and locked in that position.

Now, we will suppose that instead of 30° the work being done requires an angular adjustment of 28½°. To accomplish this adjustment the bolt 11 is withdrawn and the index wheel 8 turned through 30° to bring the next notch on the wheel into position to be engaged by the bolt. This will be done without releasing the clamping screws 20. After the index wheel is so locked by engagement of the bolt with the second notch in its periphery, the clamping screws 20 will be loosened so that the index wheel and the centering spindle may be turned with the arm 12. The gauge block used for setting the machine is removed and a thicker gauge block put in its place to thereby elevate the pin 15 the appropriate amount to turn the index wheel back a distance equal to 1½°. The clamping screws 20 will then be tightened, thereby firmly locking the work in the position of proper angular adjustment.

For the next angular adjustment of the work the same procedure will be followed. The index wheel, before the clamping screws 20 are loosened, will again be turned through 30° to bring the next succeeding notch of the index wheel into position to be engaged by the bolt. The clamping screw will then be loosened and the arm 12 and the index wheel turned backward through a distance of 1½° which can be accurately measured by substituting for the previously used gauge block a third gauge block of the proper dimensions.

Each successively used gauge block will be selected to take into account the cumulative correction. Thus the third gauge block in the example above will be of the proper thickness to elevate the arm 12 to an angle three degrees above the horizontal. A table of the angular corrections obtained with gauge blocks of different sizes will be furnished. Such tables for a wide variety of angles have been computed and are available, so called sine bar gauges, such for example as shown in U. S. Patent No. 1,551,995, September 1, 1925. Machine shops are generally equipped with gauges of this character with corresponding gauge blocks and by making the radius of the arm 12—that is, the distance from the center of rotation to the center of the pin 15—equal to the radius of the sine bar gauge and similarly making the distance of the plane surface 14 below the center of rotation of the bar 12 equal to the corresponding dimension of the sine bar gauge, the gauge blocks employed with the sine bar gauge may be similarly employed with the indexing head attachment.

The improved indexing head attachment has been illustrated in the preferred form as designed for attachment to an indexing head of a design widely used in conjunction with machine tools of various kinds, but it will be understood that the construction and arrangement of parts may be variously modified within the scope of the appended claims.

I claim:

1. In an indexing head the combination of a fixed support an indexing member mounted on said support and rotatable with the work to be indexed, a second member independently rotatable about the axis of rotation of the work, means for connecting said second member to the indexing member for movement therewith, independent means for locking said second member in stationary position and means for adjusting said second member to different angular positions about the axis of rotation of the work.

2. In an indexing head the combination of a fixed support an indexing member mounted on said support and rotatable with the work to be indexed, a second member independently rotatable about the axis of rotation of the work, means for connecting said second member to the indexing member for movement therewith, independent means for locking said second member in stationary position, said last named means permitting the adjustment of said second member to various positions and means for adjusting said second member to different angular positions about the axis of rotation of the work.

3. In an indexing head the combination of an indexing member rotatable with the work to be indexed, a second member independently rotatable about the axis of rotation of the work, means for connecting said second member to the indexing member for movement therewith, independent means for locking said second member in stationary position, and means for determining the position of said second member comprising a gauge support mounted in predetermined position with respect to the axis of rotation and a gauge-contacting member carried by said second member at a predetermined distance from said axis of rotation.

4. In an indexing head the combination of a notched index member, means for connecting said member with the work to be indexed for rotation therewith, a second member mounted for independent rotation about the axis of rotation of said work, a latch carried by said second member for co-operation with the notches of said index member, a clamping screw carried by said second member, and a stationary guide co-operating with said clamping screw whereby said second member may be locked in various positions of adjustment about the axis of rotation of the work.

5. In an indexing head the combination of a notched index member, means for connecting said member with the work to be indexed for rotation therewith, a second member mounted for independent rotation about the axis of rotation of said work, a latch carried by said second member for co-operation with the notches of said index member, a clamping screw carried by said second member, a stationary guide co-operating with said clamping screw whereby said second member may be locked in various positions of adjustment, a series of gauge blocks of different thickness, a support for a gauge block beneath said second member and a block-engaging pin carried by said second member in position to contact a gauge block on said support.

JOSEPH J. OSPLACK.